Jan. 13, 1970  D. E. TEAFORD  3,489,931

MONOLITHIC ELECTRICAL TRANSFORMER

Filed Aug. 30, 1968

INVENTOR.
DAWSON E. TEAFORD
BY () # United States Patent Office 3,489,931
Patented Jan. 13, 1970

1

3,489,931
MONOLITHIC ELECTRICAL TRANSFORMER
Dawson E. Teaford, Riverside, Calif., assignor to Bourns, Inc., a corporation of California
Filed Aug. 30, 1968, Ser. No. 756,444
Int. Cl. H01v 7/00
U.S. Cl. 310—8.1                    4 Claims

ABSTRACT OF THE DISCLOSURE

An electrical transformer comprising two sets of integral ceramic piezoelectric elements with intercalated electrode means, laminated and united into a monolithic structure during a ceramic greenware stage and fired with application of opposite polarizing potentials during cooling through the Curie point, whereby upon piezoelectric excitation of a first set of the elements as a primary and consequent physical deformation of the monolithic structure a set of potentials is generated in the second set of elements as a secondary and which generated potentials are combined as by serial connection of elements. Applied primary potential is preferably of frequency equal to the natural frequency of the polycrystalline monolithic structure.

---

The piezoelectric effect, and various natural and synthetic crystalline substances having capability for exhibiting the effect, have been extensively investigated and reported in the technical and scientific literature. Therein it is noted that piezoelectric devices may be made from unit crystals, and from polycrystalline ceramic masses; and that in the case of the latter, which may be either one or mixtures of several titanate and zirconate ceramic materials, the devices may be molded or formed to a desired shape and fired. Such ceramic piezoelectric devices have attained wide acceptance and usage, especially in the field of large transducers for converting electric wave energy to acoustic or ultrasonic wave energy.

In U.S. Patent No. 3,378,704, there is disclosed a method and means for considerably augmenting or improving the transduction effected by piezoelectric transducers of formed polycrystalline ceramic materials. Also, attainment of special and unique piezoelectric transduction effects is taught in the noted patent, e.g., bending effects. Reference may be had to the patent for details; and the disclosure of the patent is incorporated herein by reference, in the interest of brevity of this disclosure.

In the present invention, the bending effect, or the equivalent thereof, produced by electrical excitation of a monolithic mass comprising polycrystalline ceramic piezoelectric material one portion of which mass is polarized oppositely to another portion, is used to effect electric wave transformation of the character performed by an ordinary electrical transformer. Production of oppositely polarized portions of a unitary or monolithic mass of the piezoelectric material is fully explained in the patent and prior art. As an example, physical bowing or bending of a long thin mass of the monolithic ceramic material, first in one direction or sense and then oppositely, is accomplished by application of an A.C. potential or wave to two sets of superposed long plate-like electrodes which are suitably dispersed in the mass so as to be insulated, each from the other. The present invention utilizes such bending, or an analogous physical deformation of the

2 mass containing the energized electrodes or plates, to generate, across an additional set or pair (or groups of pairs) of electrodes also similarly dispersed in the monolithic mass, a second A.C. potential. As is evident, the potential created between the opposite faces of a laminar portion of the polarized piezoelectric mass can be added to like potentials created across similar laminar portions of the monolithic mass by suitably connecting electrodes disposed between the laminar portions. Thus a "secondary" A.C. potential may be produced which may bear any of several desired relationships of magnitude to that of the applied "primary" or excitation potential, within obvious limitations imposed by the practicable physical dimensions of the transducer, and with the advantage that phase-displacement effects such as are characteristic of ordinary inductive transformers may be substantially eliminated.

The preceding general statements concerning the nature of the invention make it evident that it is a principal object of the invention to provide improvements in a monolithic electric wave transducer.

Another principal object of the invention is to provide improvements in electric wave transformers.

An additional object of the invention is to provide means for permitting selection of various electric wave transformation ratios in a monolithic piezoelectric ceramic transformer.

Other objects and advantages of the invention will be hereinafter stated or made evident in the appended cleams or in the following description of details of a presently preferred exemplary physical embodiment of the invention which is illustrated in the accompanying drawings forming a part of this description and in which drawings.

Figure 1:
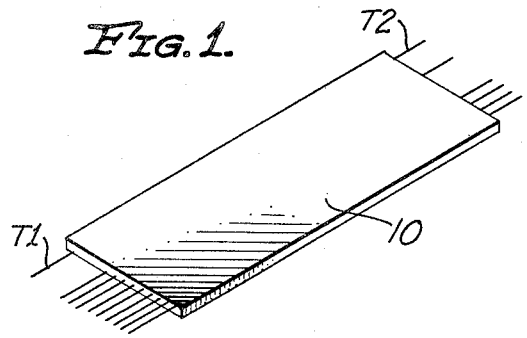
FIGURE 1 is a pictorial view of an exemplary monolithic piezoelectric ceramic transductor device according to the invention, to no particular scale.
Figure 2:
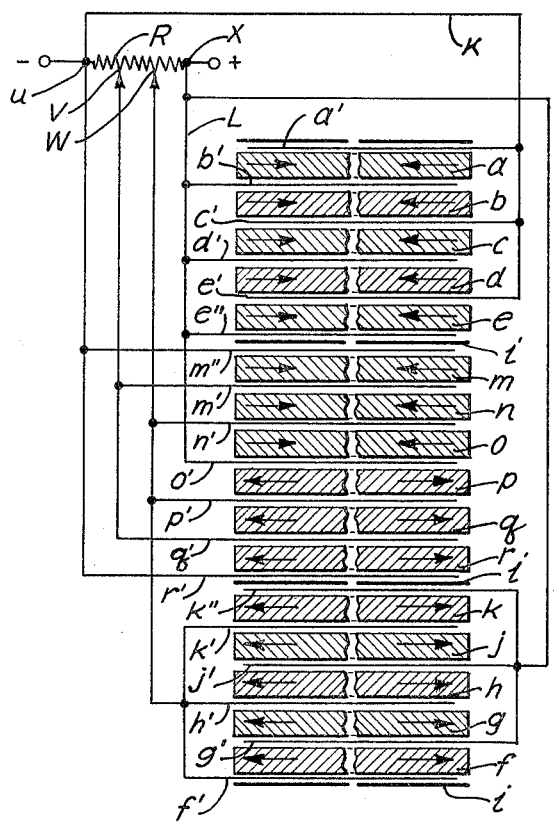
FIGURE 2 is a diagram indicating schematically the electrical connections of electrodes of the exemplary monolithic piezoelectric ceramic transductor depicted in FIGURE 1, during a stage of manufacture during which certain masses of polycrystalline material are brought to respective states of polarization.
Figure 3:
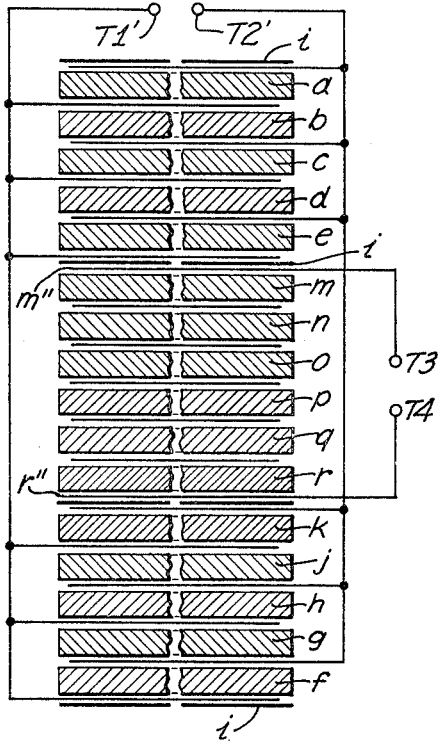
Figure 4A:
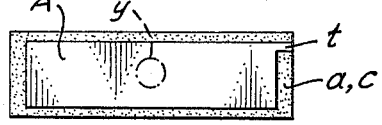
Figure 4B:
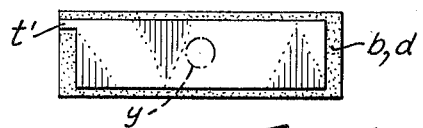
Figure 4C:
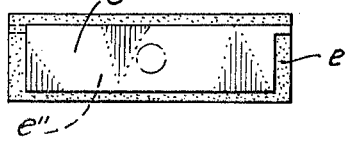

FIGURE 3 is a diagram similar to that of FIGURE 2, showing an exemplary arrangement of electrical connections for the electrodes of the exemplary transductor for operating the latter in one mode; and FIGURES 4a, 4b and 4c are plan views of ceramic greenware members with applied conductive elements, used in producing the monolithic device of FIGURE 1, and showing a selected arrangement of electrode configurations.

Referring first to FIGURE 1, there is shown a transductor 10 which has extending therefrom sets of terminal connections including, for example, wire terminals T1 and T2. The transductor, which in the specific exemplary form is a potential transformer, is comprised essentially of a monolithic mass of polycrystalline piezoelectric material and embedded very thin conductors or electrodes with electrical leads or connections. The monolithic mass is made by a plural-step procedure comprising: first, laminating or stacking greenware elements (which elements in the illustrated embodiment are thin rectangular sheet-like members of polycrystalline ceramic material and organic binder, each member generally bearing one or more films of conductive paint or other flat thin conductor); secondly, die-pressing the laminae under high pressure to consolidate or integrate the several greenware elements and interspersed conductor films into an integral mass; thirdly, firing the integral mass, and providing accessible terminals for the electrodes formed by the fired conductive paint; and thereafter polarizing respective portions of the ceramic material by cooling the portions through a range of temperatures including the Curie point of the ceramic material while selectively applying polarizing potentials of proper polarity and strength to pairs of the electrodes.

In general, the individual procedural steps are similar to those utilized in producing the transducer disclosed in U.S. Patent No. 3,378,704, and the materials employed may be those indicated in that patent. However, other polycrystalline piezoelectric ceramic materials and other binder materials may be used. For examples, U.S. Patents Nos. 2,425,626; 2,966,719; 3,125,618 and 3,223,494 disclose other ceramic greenware binders; and such piezoelectric compounds or compositions as metallic titanates, zirconates and titanate-zirconates may be used.

So that the completed monolith will be so polarized as to cause different physical distortions of different portions thereof whereby to accomplish generation of an output potential or signal incident to application of an input potential or signal, the laminae or thin strips of greenware are selectively provided with conductive areas or films of specific areal configurations, as will be more fully explained hereinafter.

In the diagrammatic representations of FIGURES 2 and 3, there is indicated a plurality of thin strips or wafers $a$, $b$, $c$, $d$, $e$, $f$, $g$, $h$, $j$, $k$, $m$, $n$, $o$, $p$, $q$ and $r$ disposed in stacked or superposed relation. The individual strips are very thin, preferably of the order of one mil or less in thickness, and of length and width dependent upon desired characteristics of the device; for example resonant frequency, transduction ratio, etc. For example, the strips may be 0.4 inch wide and two inches long. As is made evident in the drawings, the strips or greenware wafers are shown exaggerated in dimension in FIGURES 2 and 3, in the interest of clarity of detail. For convenience, the two opposite directions of polarization utilized will be termed "left" and "right," respectively; and the direction of polarization of the material in any selected one of the strip-like elements is indicated in FIGURES 2 and 3 by the direction of hatch marks, it being understood that polarization is not accomplished until the strips are consolidated into an integral monolithic structure. For example, strip $a$ is indicated as being an element or lamina to be polarized "left," by the left-inclined hatch marks; and step $b$ as an element to be oppositely or "right" polarized, by the right-leaning hatch marks. As indicated in the drawing, strip $a$ is left-polarized by application of negative potential over the upper surface and positive potential over the lower surface; and strip $b$ is oppositely polarized by application of opposite polarities of potential, as will presently be made more clearly evident.

In the diagrammatic representations of FIGURES 2 and 3, conductive films or electrodes which initially are deposited or formed on one or both sides of a ceramic greenware strip, are for convenience and clarity shown merely as lines disposed between ceramic strips. Thus the electrode $a'$, shown disposed between strip $a$ and an insulator strip $i$, is preferably initially formed on strip $a$; and similarly, conductive element or electrode $b'$ is preferably initially formed on strip $b$, and so on. As will be noted, in the exemplary transductor 10, the piezo electric ceramic material in strips $a$, $c$, $e$, $g$, $j$, $m$, $n$, and $o$ is to become polarized "left," while that comprised in the remainder of the strips is to be oppositely polarized, that is "right." This exemplary illustration of selective polarization is such that the desired result is attained, but as will be evident from consideration of electrical connections, etc., in the finished product, other polarization arrangements are possible. For an example, the polarization of piezo elements $m$, $n$ and $o$, may be opposite to that shown, if the polarization of elements $p$, $q$ and $r$ is similarly made opposite, or if appropriate changes in electrical connections are made in the device. The arrangement shown is merely illustrative.

To permit of selective polarization of the piezo elements or laminae following formation of the monolithic ceramic structure, provisions are made for application of electrical potentials across the elements as they cool to a temperature below the Curie point. To that end, and to permit integration of the elements into a monolithic structure, the conductive or potentially-conductive paint or ink is applied to certain portions only of the face areas of the strips. Thus on the ceramic greenware strips $a$ and $c$ (FIGURE 4a) the conductive ink is applied over the interior area A spaced inwardly from the edges sufficiently far to provide for adequate bonding of the strips into an integral or monolithic structure, but as indicated is extended to the edge at a selected place to provide a termination $t$. On others of the strips, such as for example strips $b$ and $d$ (FIGURE 4b) the conductive element is similarly applied but so as to have a terminal $t'$ at a different location, as indicated. In those instances in which integration or bonding of the material of the strip at the margins is insufficient to provide desired integrity of the monolith, the conductive coating or film may be omitted from one or more small interior areas, such as that indicated at $y$ in FIGURES 4a and 4b.

As is made evident in FIGURES 2 and 3, certain of the greenware strips may bear a conductive ink coat or electrode pattern on both faces; for example, note strips $e$, $m$ and $r$. Since the several strips will be united into an integral monolithic structure by compression in a closed die and by firing, the conductive paint or film may be applied as may be found to be expedient, that is, on both sides of some strips and none on others, or otherwise, it being essential only that properly located terminals be provided for and that a conductive electrode be disposed between each pair of strips. The arrangement shown is exemplary only. The electrodes may be formed by application of a platinate ink which is reduced to a platinum film when the monolith is fired.

In the device illustrated, the primary strips are divided into two sets, an upper set comprising strips $a$ through $e$, and a lower set comprising strips $f$, $g$, $h$, $j$ and $k$. The set of secondary strips $m$, $n$, $o$, $p$, $q$ and $r$, is disposed as indicated, between the primary sets. As will hereinafter be made evident each of the set of primary elements and the set of secondary elements may be considered to comprise upper and lower subsets of elements. To insulate the exposed or adjacently disposed electrodes, insulator strips $i$, are disposed as indicated in FIGURE 2. The insulator strips may be merely plain ceramic greenware strips not carrying conductive paint, and may be of the same material as the other strips or may be of unlike but compatible material containing no piezo material. It is essential only that mutual bonding of the insulator strips with other strips be effective, and that the temperature coefficient of expansion be sufficiently alike to avoid adverse effects of temperature changes.

It will be understood that a termination tab or member such as $t$ and $t'$, but differently located, is provided for each of the conductive electrodes, and that the locations of the terminations are selected so as to facilitate electrical interconnection of appropriate electrodes so that polarizing potentials may be applied and so that following polarization, sets of electrodes may be appropriately connected to external circuits, all as will be made evident in the following description of such connections.

Following die-pressing and firing of the consolidated elements, and application of terminal leads in a manner taught in U.S. Patent No. 3,378,704, connections for polarization of inter-electrode zones or portions of the polycrystalline piezo material are made as indicated in FIGURE 2. Thus for that step of the procedure, electrodes $a'$, $c'$ and $e'$ are by a conductor K connected to the low-potential side of a potential divider R at terminal U (here indicated as the − side). Similarly, electrodes b', d', and e" are by a conductor L connected to the opposite side of the potential divider R at terminal X. The latter is connected across a source of potential as indicated, of the order of several hundred volts. As is evident, the polarity of the connections at terminals U and X may be the reverse of that shown.

By means of other conductors, electrodes m" and r' are connected to terminal U of the divider, electrodes m' and q' are connected to tap terminal V, electrodes n', p', f', h' and k' to tap terminal W, and electrodes g', j' and k" are connected to terminal X, all as indicated in FIGURE 2. Thus, following application of terminals and heating of the device, as the monolithic mass and embedded electrodes cool through and to a temperature below the Curie point of the piezo material, the several inter-electrode portions of the material will be polarized as indicated, the "left polarized" portions being those indicated by left-slanting hatch marks, and the "right polarized" being the remainder, indicated by right-inclined hatching.

Following polarization of the several inter-electrode portions of the polycrystalline monolithic mass as described, the electrode terminal connections are disconnected and reconnected as indicated in FIGURE 3. For convenience in comparison and for clarity, the gross distortions in dimension of FIGURE 2 are retained in FIGURE 3, but it will be understood that at this stage of manufacture the exemplary transductor will be in general be a long thin device such as is shown in FIGURE 1. With the electrodes reconnected as indicated in FIGURE 3, application of alternating potential across terminals T1' and T2' induces, alternately, longitudinal expansion and contraction forces in the zone including the upper set of elements a, b, c, d, and e, with concurrent and opposite longitudinal contraction and expansion forces in the lower set of elements f, g, h, j and k, whereby the entire structure bends or bows alternately in opposite directions. That is, when contraction forces are generated in the upper set of elements a, b, c, d and e, there are expansion forces simultaneously generated in elements f, g, h, j and k; and vice versa. Thus the device is caused to bend or vibrate at the frequency of the applied A.C. potential.

Concurrently with the alternate bending in opposite directions of the outer groups of piezo elements, the inner subsets of elements m, n, o, and p, q, r, are vibrated synchronously with the remainder of the monolithic mass. The physical bending of piezo elements of the inner subsets generates potentials between the embedded secondary electrodes. Since the upper subset of three elements m, n and o is disposed above the longitudinal center or axis of symmetry and the lower subset of three elements p, q and r is disposed below that axis, compression forces exist in either when expansion (tension) forces exist in the other. However, due to the opposite polarization of the two subsets, the generated potentials are additive. Thus the sum of the generated potentials appears across electrodes m" and r' and is made available at terminals T3 and T4 by means of the connections shown. The phase relationship of the generated output potential to the driving potential is dependent upon the arrangement of the interconnections of electrodes.

As is evident, parallel connection of electrodes of the two middle subsets of elements may be effected, as in the case of electrical cells and other electric generators. Similarly, as is evident from consideration of the preceding descriptions, the middle portion of the device may be made to be the driver portion or "primary" by suitable connections of the electrodes therein to a source of A.C. power or signal input, and the upper and lower portions then used as the "secondary" or output section of the device. As is also evident, input and output potential ratio may be selected by utilizing the required numbers of electrodes in the primary and secondary sets.

In the preceding description it has been made evident that electrode placement may be various, that is, electrode material may be applied to both sides of some greenware strips, other strips being left uncoated; and that terminations are appropriately distributed along marginal edges but positioned to facilitate external connection of electrodes with necessary spacing for inter-electrode insulation. As an example of a greenware strip bearing an electrode film on both faces, the strip e is shown in FIGURE 4c with electrode e' on the visible or front face and electrode e" of the same area on the back face. Electrode e" has a termination at the left end of the strip, as indicated, whereby the previously described connections can be effected. Further, while the greenware strips depicted on a grossly distorted scale and with portions broken out in FIGURES 2 and 3 are of simple rectangular shape, they may be of other shapes and the device as a whole may be of other shape and of other than flat form, as is made evident by review of the aforementioned Patent No. 3,378,704. Also, the arrangement of sets and subsets of primary and secondary piezo elements may be other than as shown, subject only to being such that mechanical expansion and contraction is effected by the driving set or primary and such as to effect similar expansion and contraction of the secondary or driven set, and subject to the relative polarizations and electrode connections being effective to produce the described result.

In the light of the preceding description of an exemplary embodiment of the invention, changes will occur to others; and accordingly it is not desired that the invention be restricted to the disclosed example other than as defined in the appended claims.

I claim:
1. A piezoelectric transduction device comprising:
   first means, consisting essentially of a thin monolithic polycrystalline ceramic mass,
   second means, including a primary set and a secondary set of thin film-like electrode elements embedded in said mass in closely-spaced laminar relation with a respective thin polarized laminar piezoelectric portion of said ceramic mass interposed between next-adjacent ones of said electrodes, said second means comprising a respective terminal for each of said electrode elements, said thin electrode elements comprising a primary set thereof and a secondary set thereof,
   secondary electrical connections to electrodes of said secondary set of electrodes, and primary electrical connections to said primary set connected to receive applied alternating potential to act to cause the piezoelectric portions therebetween to act as a driver to alternately deform said ceramic mass in opposite directions,
   said laminar portions disposed between electrodes of said primary set being so polarized relative to the potentials applied therecross as to cause physical deformation of said mass, and those laminar portions disposed between electrodes of said secondary set being polarized to generate potentials therebetween incident to deformation of said ceramic mass,
   whereby upon application of alternating potential across said primary electrodes by way of said primary electrical connections said mass alternately deforms in opposite directions and deforms the laminar portions between the electrodes of said secondary set whereby there is generated across electrodes of said secondary set respective alternating potentials.

2. A piezoelectric transductor device as defined in claim 1, in which said ceramic mass is of long rectangular plan form and in which disposition and electrical connection of electrodes of said primary set is such as to cause longitudinal bending of said mass, and in which at least approximately equal numbers of primary electrode elements are disposed on opposite sides of a longitudinal center line of said mass.

3. A piezoelectric transductor device according to claim 1, in which the electrode elements of said secondary set are serially connected in the manner of series-connected capacitor electrodes.

4. A piezoelectric transductor device according to claim 1, in which the electrode elements of one of said sets are disposed between first and second subsets of the electrode elements of the other of said sets.

References Cited

UNITED STATES PATENTS

| 2,830,274 | 4/1958 | Rosen | 310—8.1 |
| 2,975,354 | 3/1961 | Rosen | 310—8.1 |
| 3,271,622 | 9/1966 | Malagodi | 310—8.2 |
| 3,378,709 | 4/1968 | Miller | 310—9.7 |

J D MILLER, Primary Examiner

U.S. Cl. X.R.

310—8.2, 9.5, 9.7